United States Patent [19]

Muraoka et al.

[11] Patent Number: 4,958,693
[45] Date of Patent: Sep. 25, 1990

[54] ELECTRONIC COUNTING BALANCE

[75] Inventors: Takatoshi Muraoka, Toyonaka; Nishio Akira, Takatsuki; Tomohiro Tsuji, Uji, all of Japan

[73] Assignee: Shimadzu Corporation, Kyoto, Japan

[21] Appl. No.: 298,567

[22] Filed: Jan. 18, 1989

[30] Foreign Application Priority Data

Jan. 18, 1988 [JP] Japan .................................. 63-9302
Jan. 18, 1988 [JP] Japan .................................. 63-9303

[51] Int. Cl.$^5$ ............................................ G01G 13/00
[52] U.S. Cl. ..................................................... 177/25.17
[58] Field of Search ....................................... 177/25.17

[56] References Cited

U.S. PATENT DOCUMENTS

4,157,738  6/1979  Nishiguchi et al. ......... 177/25.17 X
4,493,384  1/1985  Yano et al. ..................... 177/25.17
4,739,846  4/1988  Minamida et al. ............. 177/25.17

Primary Examiner—George H. Miller, Jr.
Attorney, Agent, or Firm—Koda & Androlia

[57] ABSTRACT

An electronic counting balance for deriving the number of items from a measured weight of the items through an arithmetic operation including a weight measuring unit, first and second unit-weight memories for storing two kinds of unit weights, a calculator for estimating the number of items replenished on the weight measuring unit, an inputting unit for inputting a variation coefficient of the items to be counted, a maximum addable number calculator for calculating the maximum number of the items without errors in counting, first and second comparators for comparing the maximum number of items with an estimated number of items, a sampling data memory for storing the number estimated by the calculator and data relating to the weight of the replenished items, and a unit weight calculator for estimating two kinds of unit weights in order to renew the contents of the first and second unit weight memories.

8 Claims, 9 Drawing Sheets

ELECTRONIC COUNTING BALANCE

BACKGROUND OF THE INVENTION

The present invention relates to an electronic counting balance, and more particularly to a computerized electronic balance contrived to derive the number of items from a measured weight of the items through an arithmetic operation dividing the measured weight by an estimated unit weight, that is, an estimated average weight per one of the weighed items.

It goes without saying that the precision of this type electronic counting balance depends essentially on the accuracy of the estimated unit weight. Accordingly, there have been contrived many processes of estimating the unit weight. These are roughly classified into two methods.

According to one of the two methods, first a predetermined known number of sample items are weighed to estimate an average weight per one of the whole items whose number is to be counted. The average weight is otained by dividing the measured weight by the above predetermined known number. The thus obtained average weight is employed as the basic unit weight to calculate the number of the whole items. Namely, after the unit weight is obtained, an unknown number of remaining items are additionally loaded on the counting balance to measure a total weight of the whole items, the total weight is divided by the unit weight to obtain the total number of the whole items.

According to this method, it is desirable to choose the above predetermined number to be as large as possible, since the reliability of the unit weight, and therefore, the precision of the calculated number of items is increased with an increase in the number of sampled items. Therefore, it is an important disadvantage of this method that an initial non-instrumental operation of counting a large number of sampled items is not only troublesome but also apt to be accompanied by miscounting.

According to the other of the two methods, after a known number of items are weighed to estimate a first unit weight in the same manner as that used to obtain the unit weight in the previous method mentioned above, a first new total weight is measured with a first unknown number of items replenished, and then the first new total weight is divided by the first unit weight to obtain the present total number of items. Next, the first unit weight is replaced with a second unit weight, which can be estimated by dividing the above new total weight by the present total number of items. Then, a second new total weight is measured with a second unknown number of items replenished, and the second new total weight is divided by the second unit weight to obtain the total number of items at this stage. The similar item counting processes by means of replenishing items successively and renewing unit weights are continued repeatedly until a predetermined whole number of items are counted up.

In the above method of counting items, the reliability of each estimated unit weight essentially depends on each number of replenished items. The maximum allowable number of items to be replenished at each stage of item replenisher is necessarily determined with the weight coefficient-of-varation $C_v$ of items taken into consideration. In Japanese Laid-open Patent Application No. 60-31023 is shown a means for assuring the estimated unit weight of a definite accuracy by determining a maximum allowable replenishing number of items at a probability of 0.997, with a normal distribution supposed. However, this means still has a disadvantage that, if the weight coefficient-of-variation $C_v$ exceeds 2 or 3%, the maximum allowable replenishing number mentioned above can not be so large that the resultant efficiency of successive item counting operations decreases considerably.

OBJECTS AND SUMMARY OF THE INVENTION

The present invention aims at resolving the above mentioned disadvantages involved in conventional electronic item counting balances, and makes it an object to provide an electronic counting balance improved so that the counting error can be limited within any desired fixed value.

Another object of the present invention is to provide an electronic counting balance capable of increasing the maximum allowable replenishing number of items in accordance with an increased allowable range of counting error.

Figure 1:
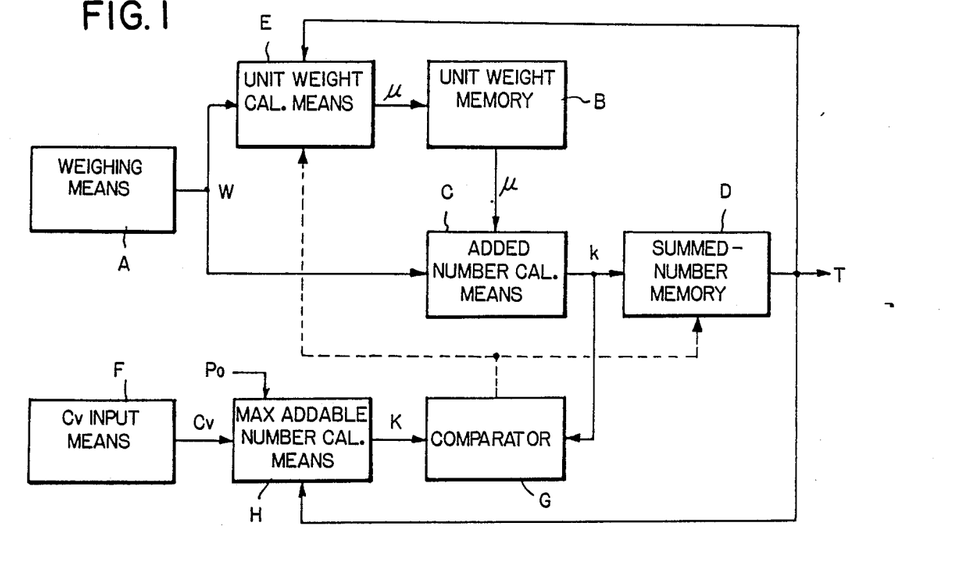
FIGS. 1, 2 and 3 illustrate three conceptual constitutions of the present invention block-diagrammatically.
Figure 2:
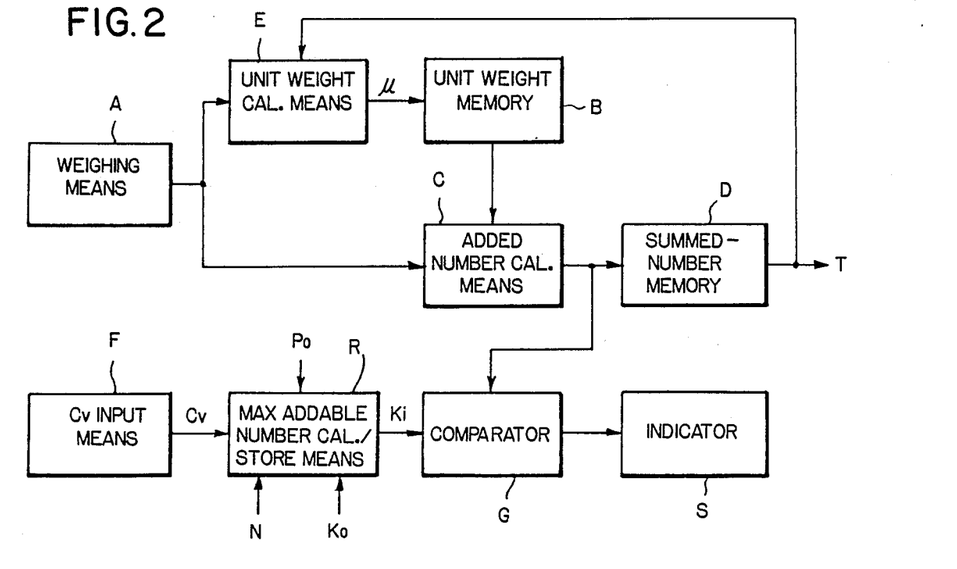
Figure 3:
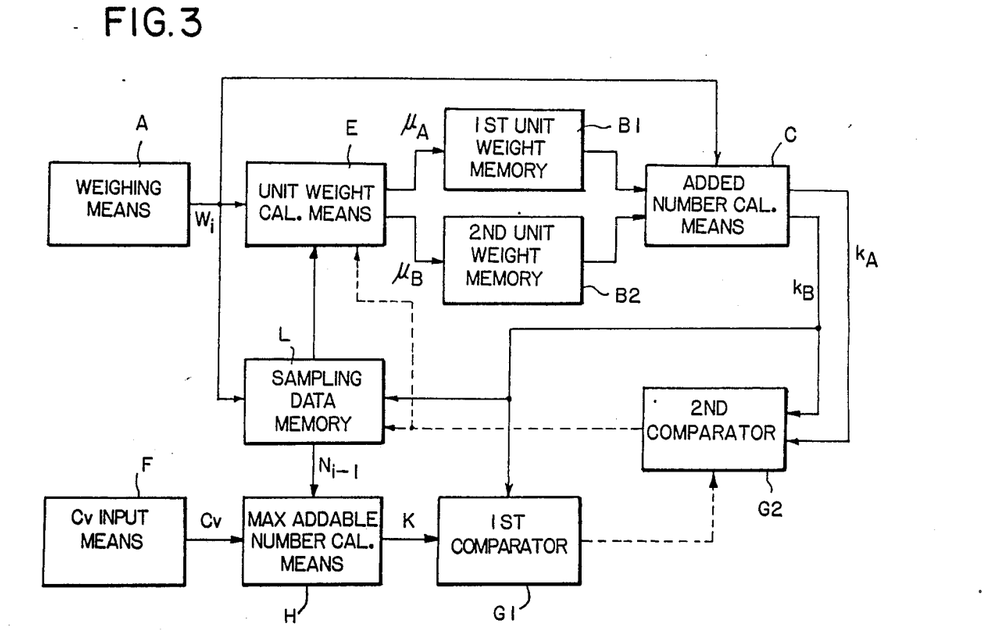

To achieve the above objects the present invention can be conceptually constituted under three different systems as shown block-diagrammatically in FIGS. 1, 2 and 3.

Both the first system shown in FIG. 1 and the second system shown in FIG. 2 partially comprise the same portion consisting of the following components: (a) a weighing means A for detecting the weight of items loaded thereon; (b) a unit weight memory B for storing a unit weight $\mu$ of items; (c) an added number calculating means G for calculating the number of items replenished on the weighing means A by using both an output w from the weighing means A and a sole content $\mu$ of the unit weight memory B; (d) a summed number memory D for storing the number k of replenished items with the same added to the number so far stored; (e) a unit weight calculating means E for calculating, to renew the content $\mu$ of the unit weight memory B, a new unit weight by using both an output w from the weighing means A and a content T of the summed number memory D; (f) a CV input means F for inputting a known "coefficient of variation" $C_v$ of weight values of the items whose number is to be counted up; and (g) a comparator G.

In addition to the above components, the first system (FIG. 1) further comprises a maximum addable number calculating menas H for calculating, on the basis of $C_v$ inputted to the CV input means F, a maximum addable number K of items, that is, the largest item-addable number that keeps the item counting free from error at a probability not less than a predetermined value $P_o$. The comparator G compares the above maximum addable number K with the replenished number k calculated by the added number calculating means C. In this first system both the unit weight calculating means E and the summed number memory D are devised so as to perform their above mentioned functions, only when the comparator judges k not to be larger than K.

On the other hand the second system (FIG. 2) is provided, with a maximum addable number calculating and storing means R and an indicator S in addition to the common components A to G. The maximum addable number calculating and storing means R calculates, in accordance with the number $K_o$ of initially loaded items and the total number of so far replenished items, a maximum addable number $K_i(i=1, 2, \ldots, N)$ and stores the same, which maximum addable number $K_i$ assures the i-th item-replenishment of error-free item counting at a probability not less than a predetermined value $P_o$. The comparator G compares $k_i$ with $K_i$, $k_i$ being the number of items replenished at the i-th item-replenishing operation and being outputted from the added number calculating means C. The result of comparison by the comparator G is displayed on the indicator S. According to the displayed result, the number of replenished items is manually decreased or increased.

The third system shown in FIG. 3 has, as components common to those of both two preceding systems, a weighing means A, an added number calculating means C, a unit weight calculating means E, and a CV input means F, and further comprises a first and a second unit-weight memories B1 and B2, an added number calculating means C, a unit weight calculating means E, a first and a second comparators G1 and G2, a maximum addable number calculating means H (contained also in the first system) and a sampling data memory L. The maximum addable number calculating means H estimates the i-th maximal addable number $K_i$ which keeps the error of item counting within a predetermined number at a probability not less than a predetermined value. The calculation of $K_i$ is made on the basis of $C_v$ inputted to the CV input means H and the number $N_{i-1}$ calculated by the added number calculating means C at the (i−1)-th item-replenishment. The sampling data memory L stores each added number estimated (by the added number calculating means C) by the time of the i-th item-replenishment and the added weight corresponding to said each added number. The unit weight calculating means E estimates, to renew the contents of the first and the second weight memories B1 and B2, two unit weight values $\mu_A$ and $\mu_B$ according to two different data stored in the sampling data memory L. The second comparator G2 compares the estimated added number $k_A$ at the i-th item-replenishment with $k_B$, while the first comparator G1 compares $k_B$ (from the added number calculating menas C) with K (a maximum addable number calculated by the maximum addable number calculating means H). In this third system constituted as outlined above, only when it is judged by the first and the second comparators B1 and B2 that the estimated added number $k_A$ (or $k_B$) is not larger than K and that, at the same time, $k_A$ is equal to $k_B$, the estimated added number $k_A$ (or $k_B$) and the added weight $W_i$ are stored in the sampling data memory L additively to their respective total values so far stored, and at the same time the unit weight calculating means E estimates new values of $\mu_A$ and $\mu_B$ to put the system in preparation for the next replenishment of items.

In the following is briefly described the theory which the present invention is based on.

Suppose a population $N(\mu, \sigma^2)$ of items whose weight value distribution obeys a normal (Gaussian) distribution, where $\mu$ and $\sigma$ are respectively the mean weight and the standard deviation, and then consider the case where first, number a number n of the items are sampled and weighed to estimate the unit weight of the items and secondly, an unknown number k of the items are taken out and weighed to arithmetically estimate the number k by dividing the weight of the k items by the above estimated unit weight. In this case, it is easily proved through a series of simple statistical calculations that the expected value of the error $\xi$ (random variable) arising in the estimated number k is zero (namely, the expected value of the estimated number is k) and that the standard deviation $\alpha$ of $\xi$ is given by:

$$\alpha = \sigma(\xi) = \sqrt{\frac{k(n+k)}{n}} \cdot \frac{\sigma}{\mu} \quad (1)$$

Therefore, the probability $P_o$ that the value obtained by rounding the estimated number to the nearest integer is free from a counting error is given by:

$$P_o = \int_{-\frac{1}{2}}^{\frac{1}{2}} \rho(\xi) d\xi \quad (2)$$

where $$\rho(\xi) = \frac{1}{\sqrt{2\pi}\,\alpha} e^{-\frac{\xi^2}{2\alpha^2}} \quad (3)$$

By making a variable transformation:

$$\beta = \frac{1}{2\alpha} = \sqrt{\frac{n}{4k(n+k)}} \cdot \frac{\mu}{\sigma} \quad (4)$$

equation (2) is transformed to:

$$P_o = 2 \int_0^\beta \frac{1}{\sqrt{2\pi}} e^{-\frac{1}{2}x^2} dx \quad (5)$$

Further, the probability $P_1$ that allows the above rounded value to have an error of plus or minus unity is given by:

$$P_1 = \int_\beta^{3\beta} \frac{1}{\sqrt{2\pi}} e^{-\frac{1}{2}x^2} dx \quad (6)$$

and the probability $P_2$ of allowing the rounded value to have an error of plus or minus two or larger is given by:

$$P_2 = 1 - 2 \int_0^{3\beta} \frac{1}{\sqrt{2\pi}} e^{-\frac{1}{2}x^2} dx \quad (7)$$

Of course the factor $\mu/\sigma$ in equation (4) is related to the "coefficient of variation" $C_v$ in the form of $\mu/\sigma = 1/C_v$.

Accordingly, in the case of employing the first or the second system (FIG. 1 or 2), if a value of $P_o$ is, in advance, obtained with equation (5) put equal to a value not less than a predetermined probability $P_x$ sufficiently near to unity, a maximum addable number K making it possible to calculate the number of replenished items without error at a probability larger than $P_x$ is obtained substituting a known number of initially supplied items and a known value of $C_v$, respectively, for n and $\mu/\sigma(=1/C_v)$ of equation (4). Practically, in the first system, the addable number calculating means H calculates K according to $C_v$ inputted to the CV input means F, and the comparator G monitors, to assure proper item-replenishment at a probability not less than $P_x$, whether or not the number of replenished items exceeds the maximum addable number K.

In the case of the second system (FIG. 2), the maximum addable number $K_1$ at the first item-replenishment is calculated from equation (4) with n put equal to $K_o$ which is a known number of items initially supplied. If it is assumed that the number $k_1$ of the items to be replenished at the 1st item-replenishment should be made equal to $K_1$, the maximum addable number $K_2$ at the second item replenishment is calculated with n put equal to $K_o+K_1$. In general, the maximum addable number $K_i$ at the i-th replenishment is calculated from equation (4) with n put equal to $$\sum_{j=0}^{i-1} K_j.$$

In short, the second system is devised so as to calculate $K_1, K_2, \ldots, K_N$ and store them in advance without using the content T of the summed number memory D. The indicator S informs the operator whether or not the number $k_i$ of items replenished at the i-th item-replenishment complies with the above assumption.

By the way, it is understood from the preceding theory that, if an error of one item may be allowable, a value $3\beta$ plays, instead of $\beta$, an important role in discussing these problems according to the theory of probability. In short, the maximum addable number can be made larger by changing the conventional relation $\beta \geq 3$ to $3\beta \geq 3$ or $\beta \geq 1$. However, since the employment of $\beta \geq 1$ allows the counting to be always accompanied by an error within $\pm 1$ item, this error is necessarily eliminated by some definite means.

Therefore, in the third system (FIG. 3), when the m-th item-replenishment is perforated, two values of $\mu_A$ and $\mu_B$ of the unit weight of items are calculated from the sampling data obtained by the time of the m-th item-replenishment, that is, the weight values $W_i$ and the estimated added number $N_i$ (i: 1, 2, ..., m−1) stored in the sampling data memory L. Then the m-th replenished number of items is estimated by using both $\mu_A$ and $\mu_B$ to obtain two estimated values $k_A$ and $k_B$ for the number of items replenished at the time of the m-th item-replenishment. The arising of the above mentioned error of $\pm 1$ item is prevented by imposing a condition that $k_A$ and $k_B$ must be equal to each other. A more detailed theoretical description is omitted to prevent the specification from being made too long.

BRIEF DESCRIPTION OF THE INVENTION

FIG. 7 shows a flow chart illustrating the operation of the second embodiment.

FIG. 9 shows a flow chart illustrating the operation of the third embodiment.

EMBODIMENTS OF THE INVENTION

Figure 4:
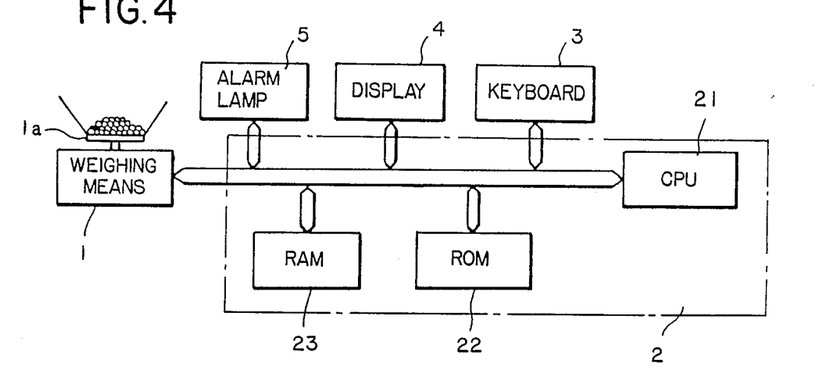
FIG. 4 shows a block diagrammatical constitution of a first embodiment of the present invention.

In FIG. 4, which shows a block-diagrammatical constitution of a first embodiment of the present invention, a weighing mechanism 1 having a weighing tray 1a outputs the digital weight data reflecting the weight of items placed on the weighing tray 1a. The weight data from the weighing mechanism 1 are inputted to a microcomputer 2 consisting of a CPU 21, a ROM 22 and a RAM 23. To the microcomputer 2 are connected a keyboard 3 through which $C_v$ is also inputted, a display 4 for digitally displaying the number of items and an alarm lamp 5 to be kept turned on while the number k of replenished items continues to be larger than a mximum addable number K. The RAM 23 includes, in addition to a work area, areas for storing estimated values of unit weight and an area for additively storing the calculated number of replenished items.

Figure 5:
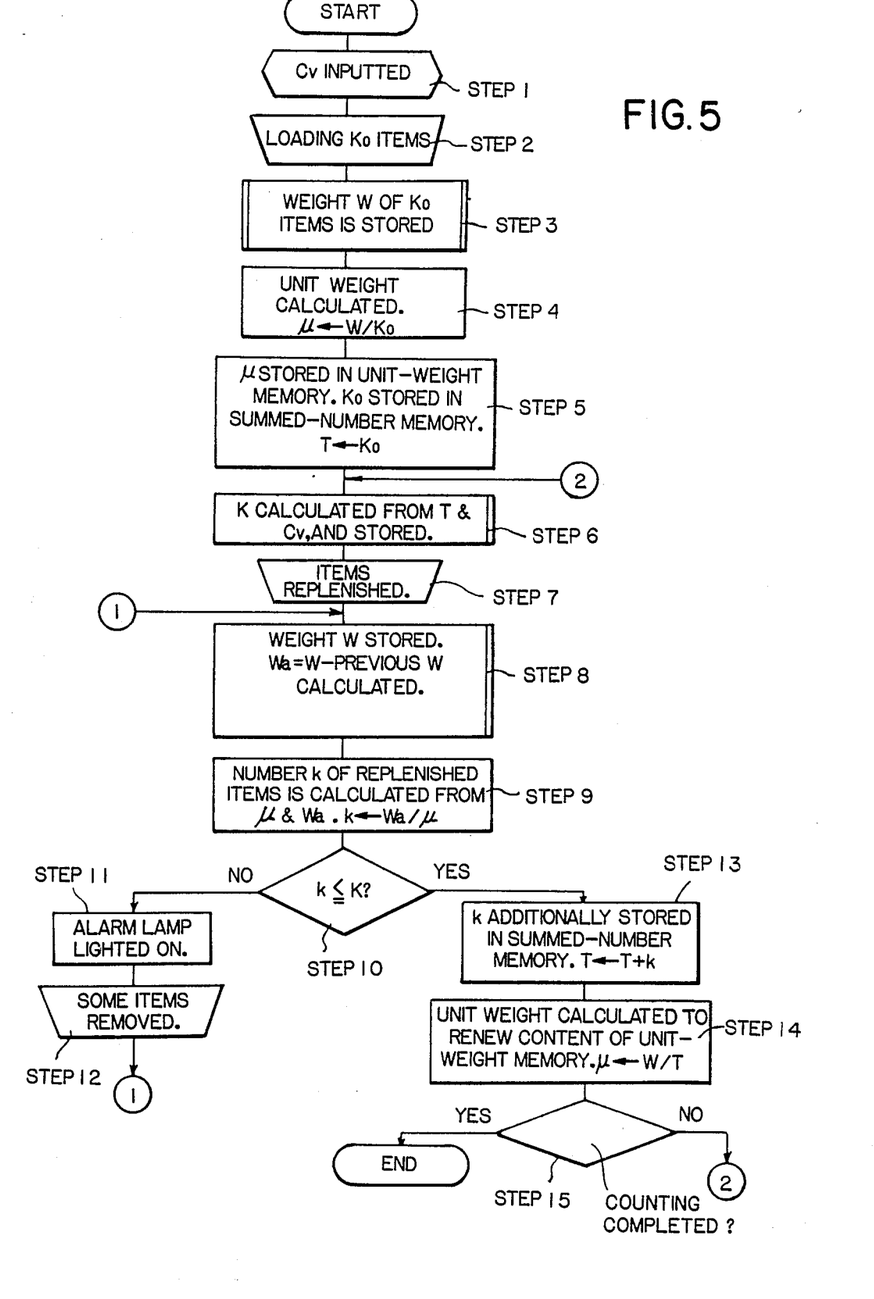
FIG. 5 shows a flow chart illustrating the operation of the first embodiment.

The operation of this first embodiment is described in the following according also to the flow chart shown in FIG. 5, which is stored in the ROM 22.

In the beginning the coefficient-of-variation $C_v$ of weight of the items to be counted is inputted (step 1) through the keyboard 3. The coefficient-of-variation $C_v$ is necessarily calculated in advance according to an equation:

$$C_v = \sigma/\overline{w} = \sqrt{\frac{\sum_{i=1}^{m} W_i^2 - \left(\sum_{i=1}^{m} W_i\right)^{2/m}}{m-1}} \cdot \frac{m}{\sum_{i=1}^{m} W_i} \qquad (8)$$

where $w_i$, $\sigma$ and $\overline{w}$ are respectively the individual weight values, the standard deviation of $w_i$ and the average value of $w_i$, all being of m items sampled from the population.

Next, a predetermined number $K_o$ of items, for example, 5 items are placed on the weighing tray 1a (step 2), and the weight W of the $K_o$ items is stored in the RAM 23 (step 3). Then, an initial unit weight $\mu=W/K_o$ is calculated (step 4) and stored in the unit weight storing area of RAM 23 (step 5), while $K_o$ is stored in the summed number storing area (step 5). At the same time the content T (equal to $K_o$ at this stage) of the summed number storing area is displayed on the display 4.

Next, a maximum addable number X, which can keep the item counting free from error at a predetermined probability $P_o$ sufficiently close to unity, is calculated from $C_v$ and the content T of the summed number memory. The calculated K is rounded to an integer not larger than the calculated value and then stored in RAM 23 (step 6).

With the weighing tray 1a replenished with items (step 7), a total weight W on the weighing tray 1a is stored, and the difference $W_d$ of W from the weight value previously stored is calculated (step 8). Then, $W_d/\mu$ ($\mu$: stored in the unit weight memory) is calculated and rounded to determine the number k of the replenished items (step 9). The number k is compared with the maximum addable number K calculated at step 6 (step 10). If k exceeds K, the alarm lamp 5 is turned on (step 11). With some items removed from the weighing tray is according to alarm (step 12), the process returns to step 8 to renew W and $W_a$.

If k is not larger than K, k is stored in the summed-number memory (step 13), and then a new unit weight $\mu$ is calculated by dividing the present total weight W on the weighing tray 1a by the content T (with k added) of the summed-number memory. The content of the unit weight memory is renewed with the new unit weight $\mu$ (step 14). The process is then returned to step 6 through step 15. This subroutine is repeated until the item counting is completed.

In the above embodiment, the maximum addable number in each time of item replenishment is calculated on the basis of the same predetermined probability $P_o$. However, the counting can be performed also under the condition that each of total N times of item replenishment should be assured of being precise at a probability not less than $P_p$. Such an assurance is obtained by the condition that the following relation:

$$\prod_{n=1}^{N} P_n \geq P_p \qquad (9)$$

exists, where $P_n$ (n=1, 2, ..., N) is a probability that assures the n-th item replenishment of being precise. Therefore, in order to finally assure $\mu$ of being precise at least at the probability $P_p$, it is necessary to determine, in advance, the value of the above $P_o$ according to the following formula:

$$P_o \geq \sqrt[N]{P_p} \qquad (10)$$

In the following is described another embodiment which is devised so as to make the related computer derive the probability $P_o$ defined by formula (10) and calculate, in advance of starting the item counting operation, the maximum addable number at each of a predetermined total times N of item-replenishment.

Figure 6:
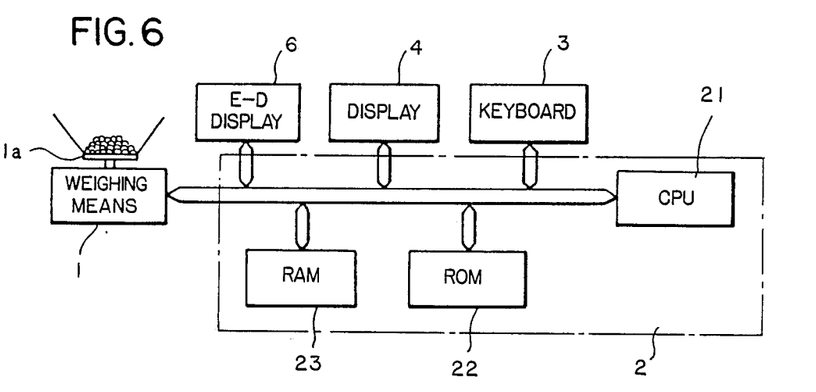
FIG. 6 shows a block-diagrammatical constitution of a second embodiment of the present invention.

According to FIG. 6 which shows the block-diagrammatic constitution of this embodiment, the constitution is very similar to that shown in FIG. 4, except that the alarm lamp 5 in FIG. 4 is replaced by a display 6 (hereinafter called E-D display), which displays the excess or deficiency of replenished items. In FIG. 6 all the constituents corresponding those in FIG. 4 are indicated by the same reference signs as those used in FIG. 4. However, the RAM 23 is additionally provided with an area to store each maximum addable number $K_i$.

The operation of this embodiment is described in the following according also to the flow chart shown in FIG. 7, which is stored in the ROM 22.

In the beginning the coefficient-of-variation $C_v$ of weight of the items to be counted is inputted (step 21) through the keyboard 3. Thereupon, from $C_v$ and a predetermined number $K_o$ of items to be supplied initially, a maximum addable number $K_1$ which assures the first item-replenishment of making the counting free from error at a predetermined probability $P_o$ sufficiently close to unity is computed and stored (step 22). The number $K_1$ can be calculated by substituting $K_o$ for n in equation (4) with $\beta$ chosen so as to make equation (5) give $P_o$.

Next, according to a predetermined number of times N of item replenishment, the maximum addable numbers $K_i$ (i=2, 3, ..., N) at the i-th item-replenishment are successively computed with $$\sum_{j=0}^{i-1} K_j$$

substituted for n in equation (4), and stored (steps 23, 24, 25, and 26). In this embodiment, the number $k_i$ of items to be replenished at each of the 1st to (N−1)-th replenishment shall be equal to the corredponding $K_i$.

With $K_o$ items loaded on the weighing tray 1a (step 27) after all $K_i$ are calculated, the weight W of the items is stored (step 28), and then the first unit weight $\mu$ is calculated (step 29). $K_o$ and $\mu$ are stored in the summed number memory and the unit weight memory, respectively (step 30).

After the above operations are completed, item replenishing operations are started. Each time items are replenished, the number $k_i$ of replenished items is calculated from the weight $W_a$ of replenished items and, then the difference $\Delta$ between $k_i$ and corresponding $K_i$ (steps 31, 32, 33, 34 and 35). If $k_i$ is smaller than $K_i$, the E-D display 6 displays, for example, "Add $\Delta$", while if $k_i$ exceeds $K_i$, "Subtract $\Delta$" is displayed (steps 36, 37 and 39). With $\Delta$ items added or subtracted in accordance with the indication by the display 6 (step 38 or 40), the process returns to step 33, and the number $k_i$ of replenished items is re-calculated.

With $k_i$ thus made coincident with $K_i$, $k_i$ is stored in the summed number memory, and at the same time a new unit weight is calculated to renew the content of the unit weight memory (steps 36, 41 and 42). The calculation is by dividing the weight W on the weighing tray 1a by the content T of the summed number memory. Then, the display 6 instructs to make the next item replenishment by displaying, for example, "Next" (step 44), if the number of times of item replenishment does not reach N. Accoding to the indication "Next" by the display 6, items are replenished (step 32). Each time items are replenished, the process from step 33 to step 44 is repeated until the number of times of item replenishment reaches N.

This embodiment can be modified so that the probability $P_o$ may automatically be calculated by the microcomputer 2 according to formula (10). Further, the E-D display 6 may be displaced by lamps to indicate the excess or deficiency of $k_i$.

In addition, although this embodiment is devised so as to proceed, only when $k_i=K_i$, to the (i+1)-th item-replenishment, the embodiment can be modified so as to give a width to $K_i$. In this case the microcomputer 2 is devised to calculate, just after $K_i$ is obtained, another number $K_i'$ which is, for example, smaller by a predetermined small number, and the (i+1)-th replenishment is permitted if $K_i' \leq k_i \leq K_i$. Though the relation of formula (9) may not necessarily be satisfied, the precision is kept at a probability near $P_p$, and therefore, in some cases no problem arises in practice.

Further, since naturally the coefficient-of-variation $C_v$ can not be obtained so precisely, a value obtained in such a manner as described in the following may be used as $C_v$.

According to the manner, m+1 discrete coefficients $C_o=0<C_1<C_2<...<C_m$ are established in advance, and then an inputted value of $C_v$ is compared with these coefficients. If $C_{i-1}<C_v \leq C_i$ $C_i$ is regarded as the coefficient of variation of the items. In the case of the embodiment described with the flow chart shown in FIG. 7, a series of maximum addable numbers $\{K_{ij}\}$ can be calculated and stored if $K_o$ and N are fixed and $C_v$ is given, and therefore it is possible for a series of maximum addable numbers $\{K_{ij}\}$ to be calculated and stored, in advance, in regard to each of $C_i$. Thus, in accordance with a result of $C_{i-1}<C_v<C_i$, the corresponding series of $\{K_{ij}\}$ can be used as the addable numbers.

Further, since there is, in general, a tendency that the coefficient of variation increases with a decrease in the unit weight (an average value of the weight of items), $C_i$ corrsponding to an inputted $C_v$ can be chosen in such a way as described in the following. According to this way, a unit weight value corresponding to each of $C_i$ is established together with $C_i$ in advance, and a corresponding $C_i$ to be used as $C_v$ is chosen in accordance with the unit weight initially obtained by dividing the weight of initially supplied items by the (known) number $K_o$ of those items.

Further, it also is possible to modify the embodiment so as to make the microcomputer 2 compute $C_v$. In this case, m items are supplied to the weighing tray 1a one by one, and each one item is supplied, the weight on the weighing tray 1a is stored in the RAM 23. After the number of items reaches m, $C_v$ can be calculated from equation ($\beta$).

Of course it also is possible to connect the microcomputer 2 to a personal computer to make the same take charge of subroutins suitably.

Figure 8:
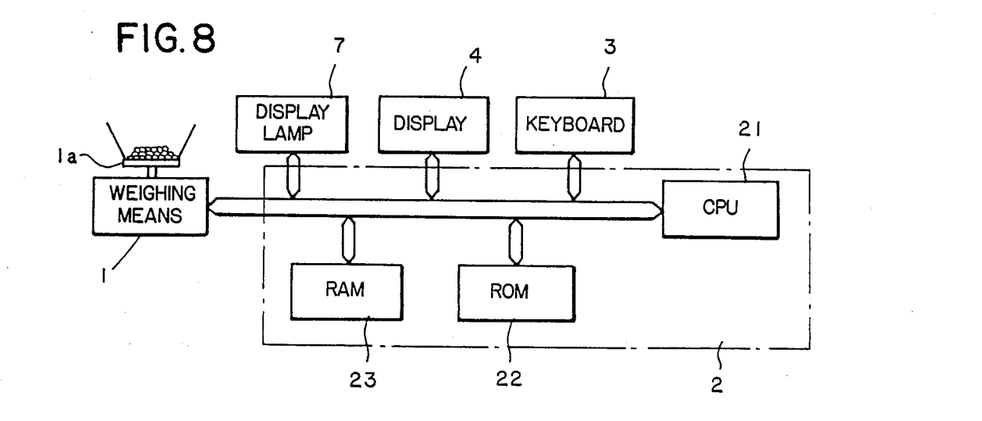
FIG. 8 shows a block-diagrammatical constitution of the third embodiment.

In the following is described a further embodiment whose block-diagrammaticl constitution is shown in FIG. 8. According to FIG. 8 the constitution is very similar to that of the embodiment shown in FIG. 6 except that the E-D display 6 of FIG. 6 is displaced by a display lamp 7. However, the RAM 23 in this embodiment includes, in addition to a work area, areas as two unit-weight memories A and B which store respectively two kinds of unit weight $\mu_A$ and $\mu_B$, a summed number memory for additively storing the calculated numbers of items replenished at all stages of item-replenishment and a sampling data memory for storing the estimated number of last replenished items and their weight. Further, the alarm lamp 5 is turned on if the number $k_B$ stays outside a predetermined width below a maximum addable number K.

The operation of this embodiment is described according also to FIG. 9 which shows the flow chart to illustrate the program stored in ROM 22.

In the beginning the coefficient-of-variation $C_v$ is inputted (step 1a) through the keyboard 3. The coefficient of variation is necessarily calculated from equation (8) in advance with m items sampled from a population of items as similarly as in the case of the first embodiment.

Next, a predetermined number $K_o$ of items are loaded on the weighing tray 1a (step 2a), and the weight W of the $K_o$ items is stored (step 3a). Then, an initial unit weight $\mu = W/K_o$ is calculated (step 4a) and stored in the unit weight memory B in the RAM 23. At the same time $K_o$ is stored in the summed number memory (step 5a), and the content T of the summed number memory is displayed on the display 4.

Next, the first maximum addable number $K_1$, which can keep the item counting free from error at a predetermined probability $P_o$ sufficiently close to unity, is calculated from $C_v$ and the content T of the summed number memory. Then, a number $K_1'$ smaller than $K_1$ by a predetermined number, for example, 5 is obtained. $K_1$ and $K_1'$ are stored in the RAM 23 (step 6a). Since only one kind of unit weight is known at present, $K_1$ is calculated, as similarly as in a conventional case, by putting $\beta$ of equation (4) equal, for example, to 3 and by substituting $T(=K_o)$ for n in equation (4). $K_1$ is stored with the fractions ignored.

Then, with the weighing tray 1a replenished with items (step 7a), the total weight on the weighing tray is stored, and the weight $W_1$ of items replenished at this first replenishment is calculated (step 8a). The weight $W_1$ is divided by the content $\mu_B$ and rounded to give the number $k_B$ of the first replenished items (step 9a). Then, it is judged at step 10a whether or not $k_B$ remains between $K_1'$ and $K_1$. The display lamp 7 indicates that $K_B$ is smaller than $K_1'$ or that $K_B$ is larger than $K_1$ (steps 11a, 12b). With some items added or removed according to the indication by the display lamp 7 (steps 13a, 14a), the process returns to step 8a, and $W_1$ is re-calculated.

If $k_B$ stays between $K_1'$ and $K_1$, the estimated number $k_B$ is additionally stored in the summed number memory (step 15a), and further stored, together with $W_1$, in the sampling data memory (step 16a). Then, at step 17a two kinds of unit weight $\mu_A$ and $\mu_B$ are calculated and respectively stored in the unit memory A and B. The unit weight $\mu_A$ is obtained by an equation $\mu_A = W_s/N_s = W_1/k_B$, where $N_s$ and $W_s$ are contents of the sampling data memory. On the other hand the unit weight $\mu_B$ is given by $\mu_B = W/T = W/(K_o + k_B)$.

Next, a maximum addable number $K_2$ at the second item-replenishment is calculated from $C_v$ and the content $N_s$ of the sampling data memory (steps 18a, 19a). The maximum addable number $K_i$ ($i \geq 2$) is the maximum number measuring the counting error of being within $\pm 1$, and obtained, as is mentioned previously, from equation (4) by substituting $N_s$ for n with $\beta$ made equal, for example, to 1.83. At this time $K_1'$ smaller than $K_i$ by 5 is calculated and store in RAM 23.

With items replenished at this state (step 20a), the total weight W on the weighing tray 1a is stored, and its difference $W_i$ from the preceding value is calculated (step 21a). This weight of replenished items is divided by two kinds of estimated unit weight $\mu_A$ and $\mu_B$ and rounded to obtain two kinds of replenished number (step 22a).

Next, it is judged whether or not $k_B$ remains between $K_1'$ and $K_i$ (step 23). If $k_B$ does not remain there, the display lamp 7 instructs addition or subtraction (steps 24a, 25a). With some items added or subtracted (steps 26a, 27a) according to the instruction by the display lamp 7, the process returns to step 21 and $k_A$ and $k_B$ are re-calculated.

If $k_B$ stays with in the above region, it is judged whether or not $k_A$ and $k_B$ are equal to each other (step 28a). If the two values are equal to each other, it is judged the $k_B(=k_A)$ has no counting error. Then, $k_B$ is sotored in the summed number memory (step 29a), and also in the sampling data memory together with $W_i$ (step 30a).

Next, the two kinds of unit weight $\mu_A$ and $\mu_B$ are renewed (step 31a). They are given by:

$$\mu_A = W_s/N_s = W_n/k_{Bn}$$

and $$\mu_B = W/T = \left(W_o + \sum_{i=1}^{n} W_i\right) / \left(K_o + \sum_{i=1}^{n} k_{Bi}\right),$$

where $k_{Bi}$ is the estimated number of items replenished at the time of the i-th item-replenished.

The above process is repeated until the item sampling is completed.

We claim:

1. An electronic counting balance for counting the number of items whose individual weight values are scattered statistically, said electronic counting scale comprising:
- a weighing means for measuring a total weight of items loaded thereon;
- a unit weight calculating means for calculating an average weight of items loaded on said weighing means;
- a unit weight memory for storing said average weight calculated by said unit weight calculating means;
- an added number calculating means for calculating the number of items replenished on said weighing means;
- a summed number memory for additively storing the number of items calculated by said added number calculating means;
- a maximum addable number calculating means for calculating, from a known coefficient-of-variation of item weight and a total number of items additively stored in said summed number memory, a maximum addable number of items which, if not exceeded by the number of items replenished on said weighing means, enables said added number calculating means to perform, at a probability not less than a predetermined probability $P_o$, an error-free calculation of the number of items replenished on said weighing means;
- a comparator for comparing the number of items calculated by said added number calculating means with said maximum addable number of items, said comparator outputting, only when the number of items calculated by said added number calculating means does not exceed said maximum addable number of items, first and second instruction signals respectively to said unit weight calculating means and said summed number memory, said first instruction signal causing said unit weight calculating means to calculate a new average weight of items and to store said new average weight of items in said unit weight memory, and said second instruction signal causing said summed number memory to additively store the number of items calculated by said number calculating means;
- whereby the number of items counted by said scale is determined and displayed.

2. An electronic counting balance as defined in claim 1, wherein said predetermined probability $P_o$ can be automatically specified so as to make a value $P_o^N$ not smaller than another predetermined probability $P_p$ at which it is assured that the number of items counted out through N times of item replenishment is free from error.

3. An electronic counting balance for counting the number of items whose individual weight values are scattered statistically, said electronic counting balance comprising:
- a weighing means for measuring a total weight of items loaded thereon;
- a unit weight calculating means for calculating an average weight of items loaded on said weighing means;
- a unit weight memory for storing said average weight calculated by said unit weight calculating means;
- an added number calculating means for calculating the number of items replenished on said weighing means;
- a summed number memory for additively storing the number of items calculated by said added number calculating means;
- a maximum addable number calculating means for calculating N maximum addable number of items $K_i$ (i=1, 2, ... N) from a known coefficient-of-variation of item weight and $$\sum_{j=0}^{i-1} K_j$$

where $K_o$ (j=0) means a known number of items initially loaded on said weighing means, $K_i$ enabling, if not exceeded by the number $k_i$ of items i-thly replenished on said weighing means, said added numbers calculating means to perform, at a probability, error-free calculations of the number of items i-thly replenished on said weighing means;
- a maximum addable number memory for storing said maximum addable number of items $K_i$;
- a comparator for comparing the number of items $k_i$ calculated by said added number calculating means with said maximum addable number of items $K_i$; and
- a display means for displaying the result of the comparison performed by said comparator and for displaying the number of items counted which is stored in said summed number memory.

4. An electronic counting balance as defined in claim 3, wherein said indicator displays the information representing $k_i = K_i$, and wherein, only when $k_i = K_i$, said unit weight calculating means calculates an average weight of items to renew the content of said unit weight memory, and said summed memory additively stores $k_i$.

5. An electronic counting balance as defined in claim 3, wherein said maximum addable number calculating means calculates not only $K_i$ but also $K'_i$ and said comparator judges whether or not $K'_i \leq k_i \leq K_i$ is satisfied, and wherein, only when the $K'_i \leq k_i \leq K_i$ is satisfied, said unit weight calculating means calculates an average weight of items to renew the content of said unit weight memory, and said summed memory additively stores $k_i$.

6. An electronic counting balance for counting the number of items whose individual weight values are scattered statistically, said electronic counting balance comprising:
- a weighing means for measuring a total weight of items loaded thereon;
- a unit weight calculating means for calculating two estimated values $\mu_A$ and $\mu_B$ of the average weight of items loaded on said weighing means;
- a first unit weight memory for storing $\mu_A$;
- a second unit weight memory for storing $\mu_B$;
- an added number calculating means for calculating two estimated values $k_A$ and $k_B$ of the number of items replenished on said weighing means, said two estimated values $k_A$ and $k_B$ being calculated according to $\mu_A$, $\mu_B$ and said total weight of items loaded on said weighing means;
- a sampling data memory for storing $k_B$ and said total weight of items loaded on said weighing means;
- a maximum addable number calculating means for calculating, from a known coefficient-of-variation of item weight and the sum of $k_B$ obtained so far and stored in said sampling data memory, a maximum addable number of items K which makes it possible to calculate the number of replenished items within a predetermined error at a probability not less than a predetermined value;

a first comparator for comparing $k_B$ and K, said first comparator outputting an instruction signal when $k_B > K$ for preventing further counting;

a second comparator for comparing $k_A$ and $k_B$, said second comparator outputting, only when $k_A = k_B$ and $k_B < K$, an instruction signal to make said unit weight calculating means calculate $\mu_A$ and $\mu_B$ and to make said sampling data memory additively store $k_B$; and a display means for displaying the number of items counted.

7. An electronic counting balance as defined in claim 6, wherein $\mu_A$ is a quotient obtained by dividing the weight of previously replenished items by the number of those items, and $\mu_B$ is a quotient obtained by dividing the total weight of items loaded on said weighing means by an estimated number of items loaded on said weighing means.

8. An electronic counting balance as defined in claim 6 or 7, wherein said predetermined error is within ±1.

* * * * *